ns Patent [19]

[11] 4,255,813
[45] Mar. 10, 1981

Miyazaki

[54] DICODE TRANSMISSION SYSTEM
[75] Inventor: Seiichi Miyazaki, Wakou, Japan
[73] Assignee: Ohkura Electric Co., Ltd., Tokyo, Japan
[21] Appl. No.: 961,554
[22] Filed: Nov. 17, 1978

Related U.S. Application Data
[63] Continuation-in-part of Ser. No. 813,339, Jul. 6, 1977, abandoned.

[51] Int. Cl.³ .......................... H04B 1/10; H04L 1/00
[52] U.S. Cl. ....................................... 375/34; 375/117
[58] Field of Search .................. 178/68, 69.1, 53.1 R; 325/38 A, 38 R; 375/34, 24, 106, 117

[56] References Cited
U.S. PATENT DOCUMENTS

| 3,419,679 | 12/1968 | Ervis | 178/53.1 R |
| 3,492,423 | 1/1970 | Schilling | 178/69.1 |
| 3,560,860 | 2/1971 | Gueldenpfennig | 178/69.1 |
| 3,601,537 | 8/1971 | Gueldenpfennig | 178/69.1 |
| 3,612,906 | 10/1971 | Kennedy | 178/69.1 |
| 3,614,620 | 10/1971 | David | 178/53.1 R |
| 3,710,027 | 1/1973 | Herter | 178/69.1 |
| 3,754,098 | 8/1973 | Abramson | 178/69.1 |
| 3,798,608 | 3/1974 | Huebner | 178/68 |
| 3,808,366 | 4/1974 | Wanamaker | 178/68 |
| 3,909,724 | 9/1975 | Spoth | 325/321 |

Primary Examiner—Robert L. Griffin
Assistant Examiner—Michael A. Masinick
Attorney, Agent, or Firm—Sherman & Shalloway

[57] ABSTRACT

A dicode transmission system wherein a data is transmitted with the aid of an intermittent asynchronous system in the form of dicode signal. The disclosed system delivers a reset pulse from a transmitter side prior to the starting of a text transmission.

9 Claims, 7 Drawing Figures

DICODE TRANSMISSION SYSTEM

BACKGROUND OF THE INVENTION

This is a continuation-in-part of application Ser. No. 813,339 filed July 6, 1977 which is now abandoned.

This invention relates to a dicode transmission system for transmitting text with the aid of an intermittent asynchronous system which inserts a start pulse prior to a text to be transmitted, and which inserts a stop pulse after the text.

In conventional data transmission, use has often been made of a modulation system such as a frequency modulation or a phase modulation and the like. These modulation systems have the following advantages.

(1) A narrow relative frequency bandwidth,
(2) absence of a direct current component, and
(3) the system is not affected by noise.

These modulation systems, however, have the disadvantage that the transmission line frequency becomes higher as compared to a transmission bit-rate, and that the high frequency on the transmission line results in a large attenuation on the transmission line.

Recently, a PCM transmission using a bipolar pulse signal has been used as the data transmission system. The PCM transmission system has the above mentioned advantages (1), (2) and (3) of the modulation system and theoretically is the system having the highest information transmission ability.

As a result, even in the case of transmitting data with the aid of an intermittent asynchronous system, it is desirable to apply the PCM code instead of using frequency modulation or phase modulation.

But, in the case of converting an NRZ signal which has asynchronously been produced into the PCM code, the circuit tends to be complex.

Alternatively, a dicode has the same property as that of the PCM code in a bipolar signaling system. The dicode however, can convert an asynchronously generated NRZ signal into a code in an extremely easy manner. But, if the dicode is applied to a transmission system for transmitting a data with the aid of the intermittent asynchronous system, it is difficult to prevent errors caused by the effect of noise. As a result, the dicode has not been used in practice for the data transmission irrespective of the above mentioned advantage.

SUMMARY OF THE INVENTION

An object of the invention is to provide a dicode transmission system which can prevent erroneous operation due to noise.

BRIEF DESCRIPTION OF DRAWINGS

The invention will now be described in greater detail with reference to the accompanying drawings, wherein.

DESCRIPTION OF THE PREFERRED EMBODIMENTS

Figure 1A:
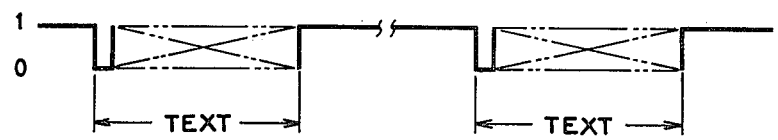
FIGS. 1a and 1b show examples of formats in an NRZ, serial form and in a dicode-encoded form, respectively, used in a conventional serial data transmission of the intermittent asynchronous system.

Referring to FIG. 1a, in an intermittent asynchronous system, the end of a character is a stop bit "1", the beginning of the character is a start bit "0", and synchronization is effected at a conversion from "1" to "0".

Figure 1B:
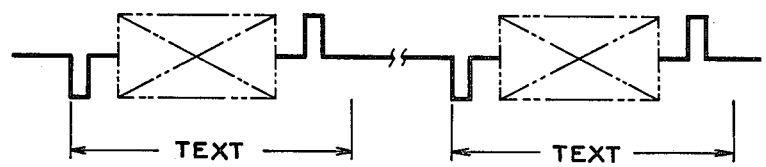

In FIG. 1b is shown a dicode of the signal format shown in FIG. 1a. As shown in FIG. 1b, a stop bit "1" is inserted between a text and the next succeeding text. If noise is produced between the stop bit "1" and the following start bit "0", the stop bit "1" would erroneously be reversed to "0" at the receiving side and the normal start-stop sequence would no longer be continued. That is, a single occurrence of noise is changed into an error which may be retained for a long time. As a result, data transmission by means of the dicode tends to be degraded by noise.

Figure 2:
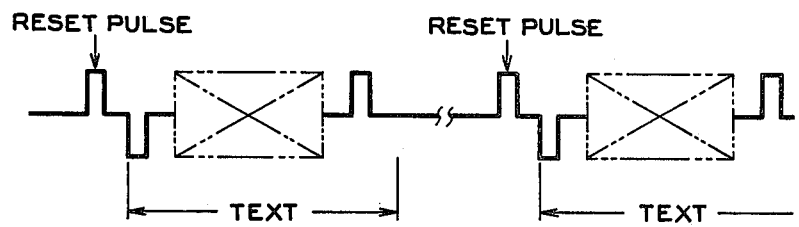
FIG. 2 shows one example of a format of a signal according to the invention.

The present invention makes it possible effectively to prevent the erroneous operation due to noise from occurring at intervals between two adjacent texts. For this purpose, one positive pulse is delivered as a reset pulse prior to the transmission of each text as shown in FIG. 2. This reset pulse functions always to bring the receiver side condition into "1" prior to receiving the text even when the receiver side condition has been converted into "0" due to noise. As a result, it is possible to receive the text at the receiver side without error. The reset pulse may be delivered at a time relatively close to the start of the text transmission. In addition, it is not always necessary to make the width of the reset pulse equal to the width of the dicode pulse.

Figure 3:
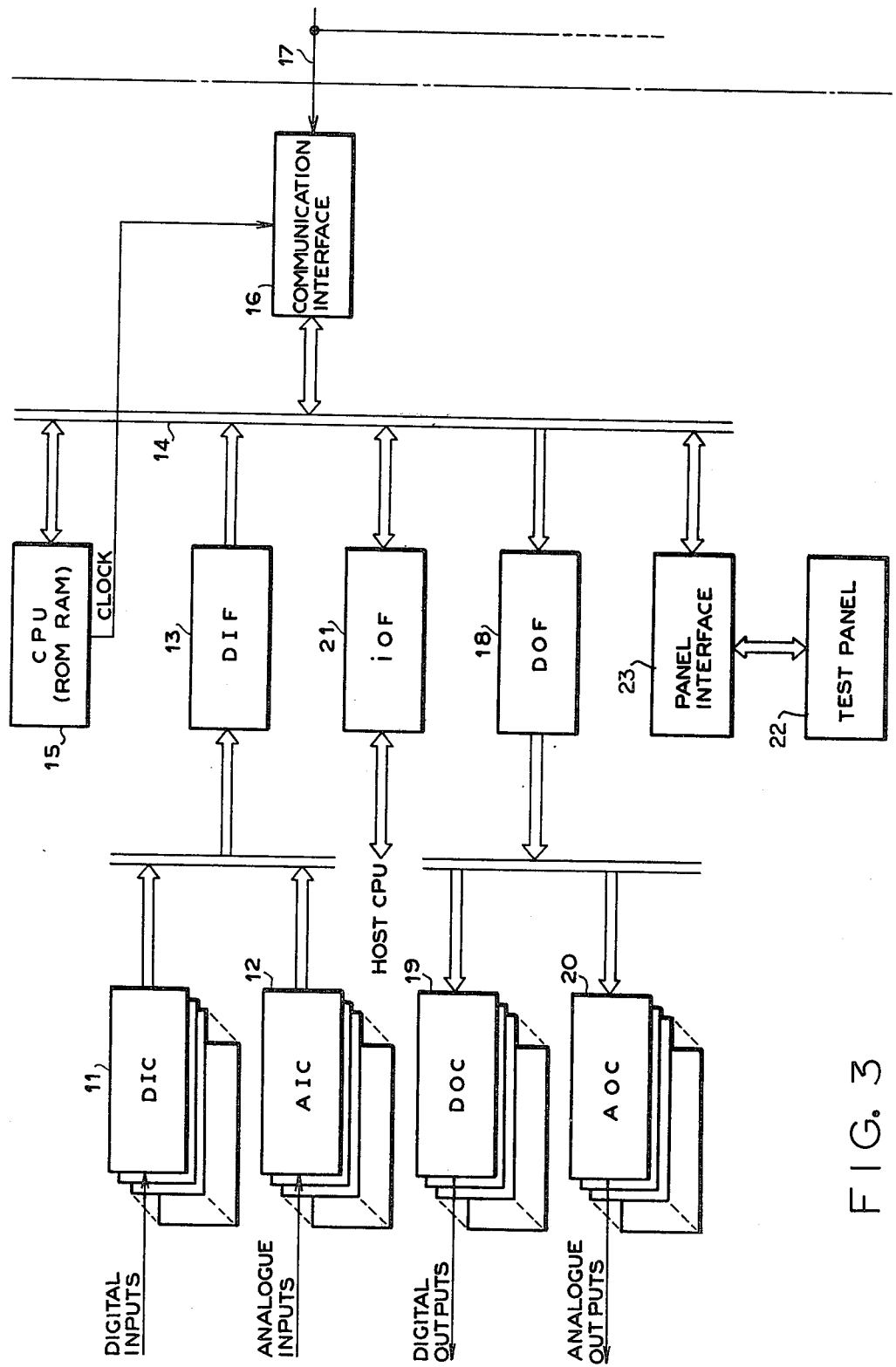
FIG. 3 is a block diagram showing part of a microcomputer system with a communication interface to which is applied a dicode transmission system embodying this invention.

FIG. 3 shows a microcomputer system with a communication interface to which is applied a dicode transmission system of this invention. This computer system has digital input cards 11 for receiving digital inputs and analog input cards 12 for receiving analog inputs, the outputs of the cards being fed to a data bus 14 via a digital input interface 13. To the data bus 14 are connected a central processing unit CPU having ROM and RAM, and a communication interface 16, such that the signals are sent from the bus line 14 to a transmission line 17 via the interface 16 in the transmission mode. Further, in the receive mode, signals produced from other terminals are fed to the bus line 14 via the transmission line 17 and interface 16. The signals received by the bus line 14 are fed to digital output cards 19 and analog output cards 20 via digital output interface 18 connected to the bus line 14, whereby digital outputs and analog outputs are taken out from the respective cards. Reference numeral 21 represents an input/output interface inserted between the bus line 14 and the host CPU, and reference numeral 22 represents a test panel connected to the bus line 14 via a panel interface 23. The setup and operation of the microcomputer system of this invention are the same as those of the conventional counterparts except the setup and operation of the communication interface 16, and can be easily comprehended by those skilled in the art in this field.

As shown in more detail in FIG. 4, the communication interface 16 is made up of a bus line driver/receiver 31, address decoders 32, 33, a universal asynchronous transmitter/receiver (hereinafter referred to as "UART") 34, a command latch decoder 35, an encoder/driver 36, a receiver/decoder 37, an input/output transformer 38, a 1/16 counter 39, an interval timer 40, and an idle timer 41.

In the transmission mode, the UART converts parallel signals received from the bus line 14 via the driver/receiver 31 into serial signals. The serial signals are fed to the encoder/driver 36 in order to convert the NRZ signals into dicode signals. The output signals of the encoder/driver 36 are sent to a transmission line 42 via a transformer 38. Further, in the receive mode, the dicode signals fed from the transmission line 42 via the transformer 38 are converted into NRZ signals by the receiver/decoder 37, and are then subjected to the serial-to-parallel conversion in the UART 34.

The command latch decoder 35 receives the data which will be taken out from, or will be fed to, the driver/receiver 31, and produces a reset pulse, a mode-changing signal, a reset signal to the idle timer, and an interval timer acknowledge signal. An idle timer 41 detects the idle times, and is composed of three counters. An interval timer 40 consists, for example, of four counters for setting intervals that are different from each other; an output signal of a selected counter is used as an interruption signal to the CPU.

Figure 5:
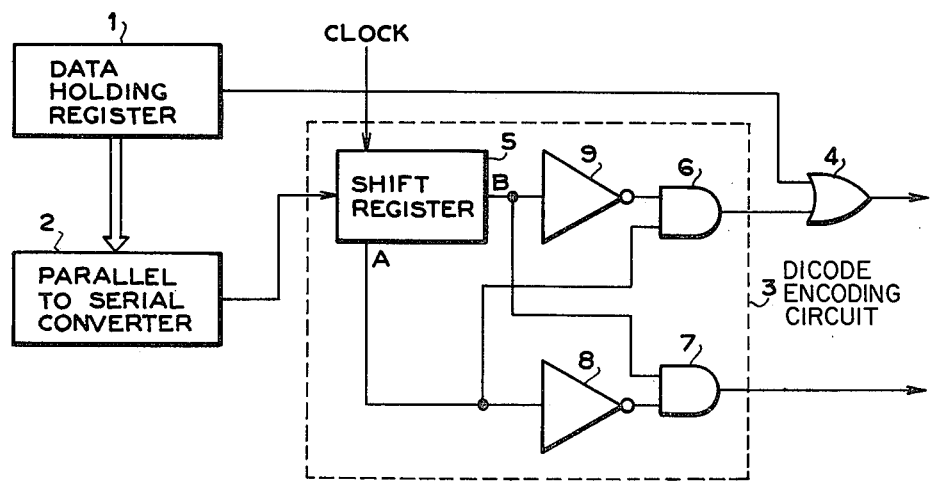
FIG. 5 is a block diagram of a transmitter circuit of the system shown in FIGS. 3 and 4.
Figure 4:
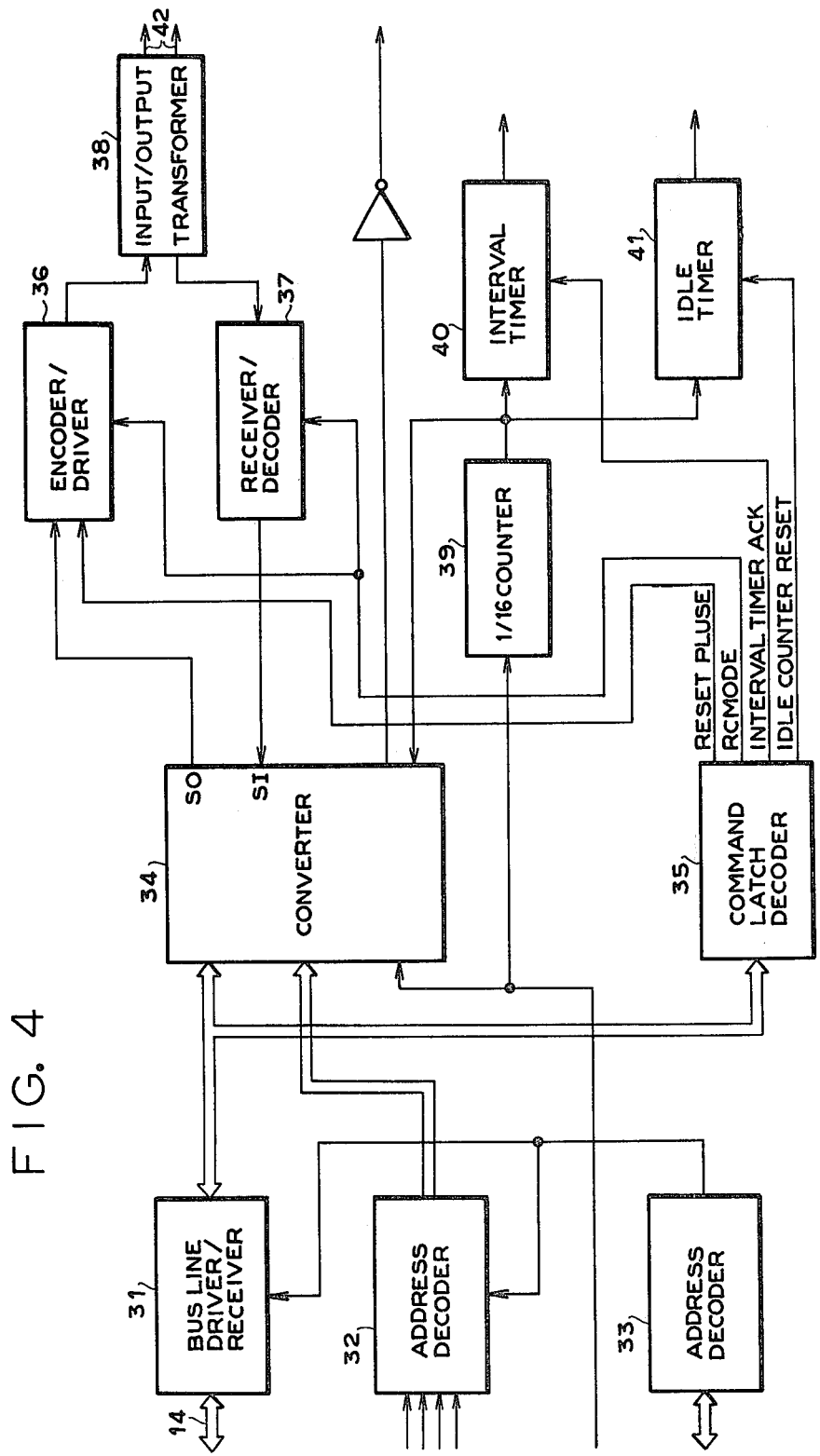
FIG. 4 shows the construction of the communication interface of the system of FIG. 3.

In FIG. 5 is shown a transmission side of the communication interface shown in FIG. 4 for transmitting data by a dicode transmission system according to this invention. Data, held in a register (1) and to be transmitted, is supplied as a parallel signal, in a sequence of words or lytes to a parallel-to-serial converter (2). The data holding register (1) may be an accumulator or a data region of a memory in the microprocessor (15) of the microcomputer system as shown in FIG. 3. The P-S converter 2 functions to convert the parallel signal into a serial signal and to prepare a text to which a start bit, a stop bit and a parity bit, etc., are attached. The text thus prepared is delivered to a dicode encoding circuit 3. The data holding register 1 also functions to generate a reset pulse. This reset pulse is delivered through an OR gate 4 to a positive pulse transmission line.

Figure 6:
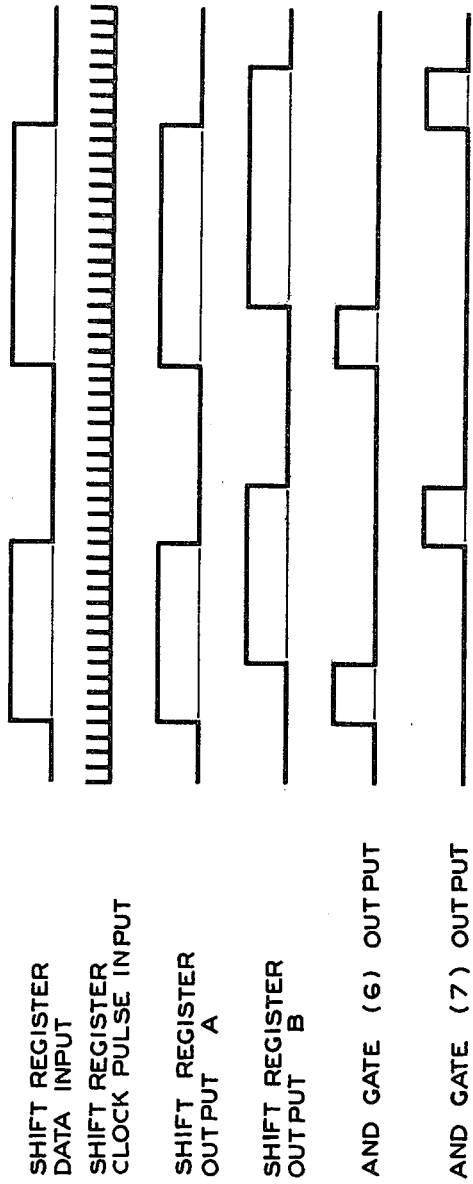
FIG. 6 is a timing chart of the signals at the respective points of the circuit of FIG. 5.

The dicode encoding circuit 3 comprises a shift register 5 for delaying the signal delivered from the P-S converter 2 by a given time. The shift register 5 functions to deliver an output A generated therefrom at intervals of time as determined by a clockpulse supplied thereto and an output B delayed from the output A by a given time. The output A is directly supplied to a first AND gate 6 and supplied through an inverter 8 to a second AND gate 7. The output B is directly supplied to the second AND gate 7 and supplied through an inverter 9 to the first AND gate 6. As a result, at the output terminal of the first AND gate 6 appears a signal having a level "H" which remains during a definite portion of time at which the output A has the level "H" and the output B has a level "L". At the output terminal of the second AND gate 7 appears a signal having the level "H" which remains during a definite portion of time at which the output A has the level "L" and the output B has the level "H" as shown in FIG. 6. The output of the first AND gate 6 is delivered through the above mentioned OR gate 4 to the positive pulse transmission line. In FIG. 6 are shown signal waveforms produced on various circuit elements shown in FIG. 5.

The erroneous operation of dicode due to noise occurs not only during the intervals of time at which the stop bit is transmitted, but also in the course of text transmission. It is thus possible that the erroneous operation of the dicode due to noise which occurs in the course of the text transmission becomes a burst error owing to the property of the dicode. However, such burst error can be eliminated by applying a well known system such as a double transmission checking system.

As stated hereinbefore, the use of the reset pulse delivered prior to the delivery of the text according to the invention provides the important advantage that it is possible positively to prevent occurrence of transmission errors due to noise while carrying out the data transmission with the aid of the dicode in practice.

What is claimed is:

1. In an asynchronous transmission system for transmitting a text as dicode signals having start and stop bits, the improvement comprising:
   (a) a data holding register for retaining said text to be transmitted and a reset pulse bit, and for sequentially delivering data in a bit-parallel, word-serial form just after transmission of said reset pulse bit;
   (b) a parallel-to-serial converter connected to said data holding register for receiving and converting said data to an output serial signal stream having said start and stop bits;
   (c) a dicode encoding circuit connected to said parallel-to-serial converter for receiving said output serial signal stream therefrom; and
   (d) OR-gating means connected to said data holding register for receiving said reset pulse bit therefrom and connected to said dicode encoding circuit for receiving an output therefrom; said OR-gating means delivering an output to a transmission line via a line driving circuit.

2. The asynchronous transmission system according to claim 1 wherein said dicode encoding circuit comprises shift register means for delaying said output signal of said parallel-to-serial converter by a given, predetermined time, and for generating first and second pulse signals corresponding to positive and negative pulses of said dicode signals, respectively, and further comprising gating means connected for receiving said first and second pulse signals and for delivering a further output signal of said dicode encoding circuit to said line driving circuit, said line driving circuit providing an output which is fed to a center-tapped primary winding of a transformer having a secondary winding connected to said transmission line.

3. The asynchronous transmission system according to claim 1 wherein said reset pulse is inserted prior to the transmission of said text for always bringing a receiver side condition into an initial state and thereby preventing occurrence of transmission errors due to noise while carrying out a data transmission with the aid of the dicode in practice.

4. The asynchronous transmission system according to claim 3 wherein said reset pulse is a positive pulse having the same polarity as that of said stop bits transmitted in said dicode signals, and wherein said reset pulse is transmitted closely before the time for starting transmission of said text for always bringing said receiver side condition into a "1" prior to receiving said text even when said receiver side condition has been converted into "0" due to noise.

5. The asynchronous transmission system according to claim 1 further comprising means for transmitting said reset pulse with a duration differing from that of pulses associated with said dicode signals.

6. The asynchronous transmission system according to claim 1 including input means for analog and digital data to be transmitted.

7. The asynchronous transmission system according to claim 1 further comprising a receiving system for signals transmitted by other similar transmission systems, said receiving system including output means for outputting said received dicode signals as digital and as analog output signals.

8. The asynchronous transmission system according to claim 1 further comprising receiving means for receiving dicode signals from said transmission line, and decoding means connected to said receiving means for converting the received dicode signal to NRZ signals.

9. An asynchronous transmission system according to claim 8 wherein said received dicode signals are serial signals, said decoding means providing serial NRZ signals, and further comprising serial-to-parallel converter means connected to said decoding means for converting said serial NRZ signals to parallel NRZ signals.

* * * * *